United States Patent
Forbes et al.

(10) Patent No.: US 7,184,672 B2
(45) Date of Patent: Feb. 27, 2007

(54) ANALOGUE MAINTENANCE DETECTION

(75) Inventors: Duncan Forbes, Bishop's Stortford (GB); Giulio Giovannini, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 666 days.

(21) Appl. No.: 10/254,109

(22) Filed: Sep. 25, 2002

(65) Prior Publication Data

US 2004/0057729 A1    Mar. 25, 2004

(51) Int. Cl.
*H04B 10/08* (2006.01)
*H04B 10/06* (2006.01)

(52) U.S. Cl. .................... 398/208; 398/210; 398/33

(58) Field of Classification Search ............ 398/30–33, 398/204, 206, 208–211, 78, 82
See application file for complete search history.

(56) References Cited

U.S. PATENT DOCUMENTS

| | | | |
|---|---|---|---|
| 6,160,649 A * | 12/2000 | Horiuchi et al. | 398/34 |
| 6,212,310 B1 * | 4/2001 | Waarts et al. | 385/24 |
| 6,281,995 B1 * | 8/2001 | Spickerman et al. | 398/9 |

* cited by examiner

*Primary Examiner*—Dalzid Singh
(74) *Attorney, Agent, or Firm*—Barnes & Thornburg LLP

(57) ABSTRACT

Methods and apparatus are described for processing an optical signal. The optical signal comprises at least a first channel signal at a first wavelength modulated by a first frequency, a second channel signal at a second wavelength modulated by a second frequency, and a third channel signal at a third wavelength modulated by a third frequency. The method includes receiving the optical signal, and splitting the received optical signal into at least two optical bands, a first optical band comprising the first and second channel signals, and a second optical band comprising the third channel signal. A first electrical signal is formed, proportional to the total optical power of the first optical band.

11 Claims, 15 Drawing Sheets

US 7,184,672 B2

ANALOGUE MAINTENANCE DETECTION

FIELD OF THE INVENTION

The present invention relates to methods and apparatus suitable for the processing of optical signals modulated by low frequency signals such as analogue maintenance signals. Such methods and apparatus are suitable for, but not limited to, improving the detectability of analogue maintenance signals.

BACKGROUND OF THE INVENTION

Modern optical communication systems, such as those used in the telecommunications field, typically use wavelength division multiplexing. Wavelength division multiplexing (WDM) is the sending of signals of different wavelengths simultaneously along the same transmission medium (normally an optical fibre). Each of the separate wavelengths can carry a separate information signal, thus allowing the simultaneous transmission of a number of different signals. Typically, each wavelength utilised to carry an information signal is referred to as a channel.

Information is carried within each channel by modulating the optical signal at a relatively high speed e.g. bit rates of 2.5 Gb/s to 40 Gb/s are common.

Analogue maintenance is the application of a relatively low frequency tone (less than the information bit rate), at a relatively small amplitude to the optical signal.

For instance, tones within the frequency range 300 kHz to 400 kHz may be used. Such a frequency is utilised to amplitude modulate the optical information signal at a relatively small modulation depth e.g. 1% of the peak power of the optical signal.

Analogue maintenance signals can be utilised to carry signalling data, for instance indicative of the source of the relevant channel, or for control of the optical network. For example, each channel within a WDM signal may be allocated a frequency band within the range 300 kHz–400 kHz, each band covering eight separate frequencies separated by 32 Hz. Signalling information can thus be transmitted by applying in turn different sequences of the eight frequencies to modulate the relevant optical signal.

As the analogue maintenance signal is applied at a predetermined proportion of the optical signal power, detection and determination of the amplitude of an analogue maintenance signal can be used to calculate the power in the relevant channel, thus easily allowing the monitoring of the performance of an optical link.

FIG. 1 shows an optical network 100, including a node 200. The node 200 includes apparatus for the detection of an analogue maintenance signal. In this instance, the node 200 also includes a receiver 300 for detecting at least one of the information signals carried by a relevant channel. The receiver 300 will typically include a WDM demultiplexer, arranged to demultiplex the optical signal into individual channels. Each individual channel can then be detected by a photo detector.

An optical signal, comprising a number of channels, is received from the rest of the network 100 by the node 200. The majority of this signal is passed to the receiver 300. A predetermined proportion of the signal (typically 1%–5%) is removed by optical tap 210, and passed to a photo detector 220, such as a photodiode. The photo detector converts the optical signal to an electrical signal. For convenience an amplifier 230 amplifies the electrical signal, the output voltage of the amplifier being passed to both a band pass filter 250 and a low pass filter 240.

The low pass filter 240 is arranged to pass only very low frequency components of the electrical signal (e.g. signals less than 1 kHz), with the resulting DC output voltage being indicative of the total power of the optical signal i.e. the sum of the powers within each channel.

The band pass filter 250 is arranged to filter out both the DC component of the input signal, and the high frequency components (e.g. those frequencies corresponding to the bit-rate of the information signal), and hence to pass those frequencies corresponding to the analogue maintenance signals. Typically, the band pass filter may be arranged to pass frequencies within the range 1 kHz to 1 MHz.

The signal passed by the band pass filter will thus contain frequency signals corresponding to each of the analogue maintenance signals for each channel. By measuring the relative amplitudes of each frequency component, the relative powers of each channel within the optical signal can be determined (as the power of a maintenance signal is a predetermined proportion of the total signal power). As the total power of the optical signal can be determined from the output of the low pass filter 240, consequently the optical power per channel can be determined. Further, by analysing the exact frequency present at any given instance, the signal information carried by the analogue maintenance signal can be determined.

Typically, to determine the relevant frequency components and amplitudes of the analogue maintenance signals, the output of the band pass filter 250 is passed to an analogue to digital converter 260, which digitizes the signal. The resulting digital signal is passed to a digital signal processor 270, which can determine both the frequency components and amplitudes of the frequency components present.

Stimulated Raman Scattering (SRS) results in the transfer of optical power between different wavelengths of optical signal being transmitted simultaneously along a transmission medium such as optical fibre. The power transferred between the different wavelengths is a function of the instantaneous channel powers.

FIG. 2 illustrates the Raman gain coefficients for a typical optical fibre in relation to a pump signal at 1530 nm. Within the graph, the solid line indicates the actual Raman gain coefficient, with the dotted line indicating an approximation of the Raman gain coefficient g that can be used to simplify the Raman power transfer calculation. As can be seen, the Raman gain coefficient within this range increases with increasing wavelength.

Consequently, an optical signal incorporating two or more channels at separate wavelength will see power being transferred from the lower wavelength channel to the higher wavelength channel as the signal is transmitted along the optical fibre.

It is an aim of embodiments of the present invention to provide apparatus and methods for improved optical processing of an optical signal, so as to improve the detection of the analogue maintenance signal.

SUMMARY OF THE INVENTION

In a first aspect, the present invention provides an apparatus for processing an optical signal, the optical signal comprising at least a first channel signal at a first wavelength modulated by a first frequency, a second channel signal at a second wavelength modulated by a second frequency, and a third channel signal at a third wavelength modulated by a third frequency, the apparatus comprising: an input for receiving the optical signal; a splitter arranged to split the received optical signal into at least two optical bands, a first optical band comprising at least the first and second channel signals, and a second optical band comprising at least the third channel signal; and a first photo detector arranged to receive the first optical band, and to output a first electrical signal proportional to the total optical power of the first optical band.

By processing the optical signal in this way, the largest value components of ghost analogue maintenance signals (formed by SRS transferring power between the different channels) can be removed, and thus the analogue maintenance detection error due to SRS reduced.

Preferably, the apparatus further comprises a first electrical filter arranged to filter the first electrical signal so as to pass said first frequency and to block said third frequency; a second photo detector arranged to receive the second optical band, and to output a second electrical signal proportional to the total optical power of the second optical band; and a second electrical filter arranged to filter the second electrical signal so as to pass said third frequency and to block said first frequency.

Preferably the apparatus further comprises an adder arranged to sum the filtered electrical signals.

Preferably, the apparatus further comprises a signal processing unit arranged to analyse the electrical signal to determine the amplitudes of frequency components within the signal.

Preferably, said splitter comprises a fused fibre coupler.

In another aspect, the present invention provides a node for an optical network including the above apparatus.

In a further aspect, the present invention provides an optical network comprising such a node.

In a further aspect, the present invention provides a method of offering a data transmission service over an optical network comprising a node.

In another aspect, the present invention provides software for use in implementing the above apparatus.

In another aspect, the present invention provides a method of processing an optical signal, the optical signal comprising at least a first channel signal at a first wavelength modulated by a first frequency, and a second channel signal at a second wavelength modulated by a second frequency, and a third channel signal at a third wavelength modulated by a third frequency, the method comprising the steps of: receiving the optical signal; splitting the received optical signal into at least two optical bands, a first optical band comprising at least the first and second channel signals, and a second optical band comprising the third channel signal; and producing a first electrical signal proportional to the total optical power of the first optical band.

Preferably, at least said first frequency is an analogue maintenance signal.

Preferably, wherein the first optical band comprises over 50% of said first channel signal and less than 50% of said third channel signal.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENTS

The present inventors have realised the problems associated with utilising analogue maintenance signals in optical signals experiencing Stimulated Raman Scattering (SRS). They have realised how this will effect the accuracy of power measurements per channel gained from such signals, and propose a scheme for increasing the accuracy obtainable from such measurements.

Figure 3:
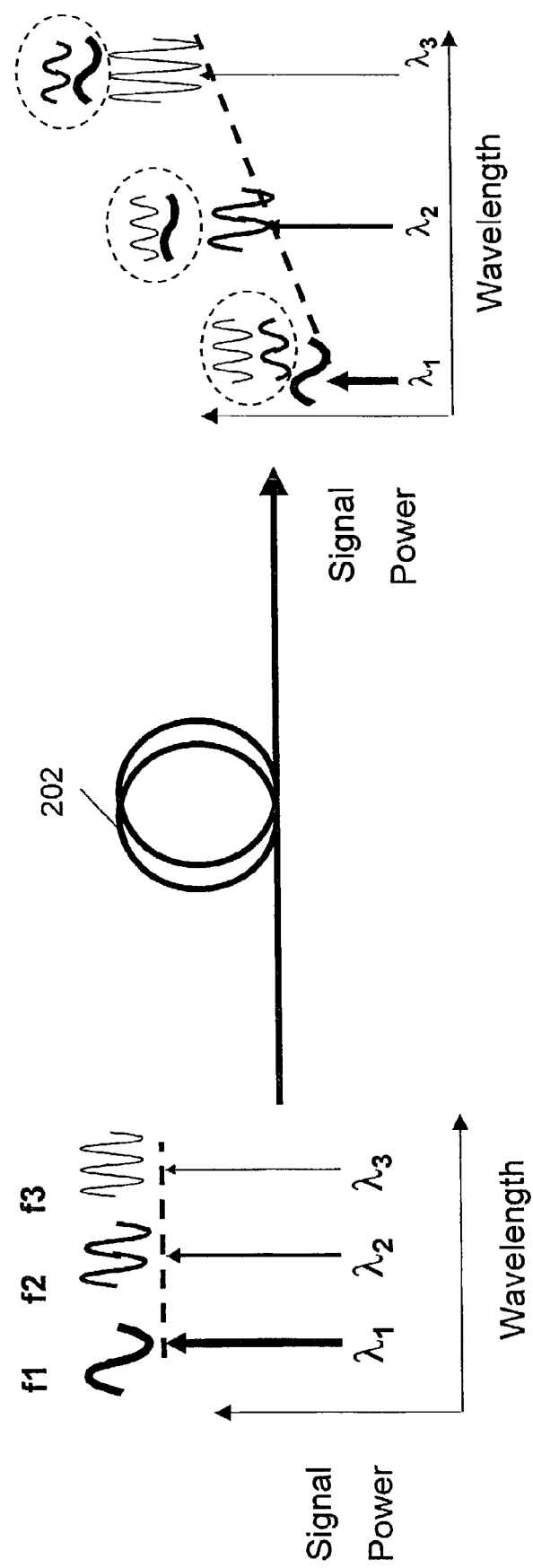
FIG. 3 is a schematic diagram illustrating the effect of Stimulated Raman Scattering on three channel signals including respective analogue maintenance signal.

FIG. 3 illustrates the effect of SRS on signals being transmitted along a length of optical fibre 202. For the purposes of explanation, it is assumed that three separate channels are simultaneously input to the fibre at three different wavelengths (under $\lambda_1$, $\lambda_2$, and $\lambda_3$), as shown on the left hand side of the figure. The signal powers of the respective channels are substantially equal, and indicated by separate upright arrows.

Each of the three channels has a separate, low frequency analogue maintenance signal applied ($f_1$, $f_2$, $f_3$).

These signals are input to a length of optical fibre. During transmission along the fibre, due to the Raman effect, and the dependence of the Raman gain on both instantaneous channel power and wavelength, power is transferred from shorter wavelength channels to longer wavelength channels. Thus power from the first channel at $\lambda_1$ will be transferred into the channels at both $\lambda_2$ and $\lambda_3$. Similarly, power from the channel at $\lambda_2$ will be transferred to the channel at $\lambda_3$.

As the Raman gain is dependent on the instantaneous channel power, and as the power of each channel is modulated by the analogue maintenance signal, ghost tones of the original analogue maintenance signals will appear on each channel.

The arrows at the right hand side of FIG. 3 indicate how the relative signal powers will have changed. The signals above each arrow indicate the respective analogue maintenance signals that will be present in each channel. The signals circled are ghost tones, that have been transferred to the channel due to Stimulated Raman Scattering.

As the Raman gain is dependent upon the instantaneous power of both the channel from which power is being transferred and the channel to which power is being transferred, ghost tones of all three analogue maintenance frequencies ($f_1$, $f_2$, $f_3$) will be present in each of the channels. However, only those analogue maintenance frequencies being transferred in power to a longer wavelength channel will be in phase with the original frequency component; those frequency components appearing in lower wavelength channels will be in anti-phase with the original component.

For instance, $f_1$ is the frequency component originally appearing in the channel at $\lambda_1$. As power is transferred from the channel at $\lambda_1$ to both the channels at $\lambda_2$ and $\lambda_3$, then consequently a proportion of the power from the analogue maintenance signal will be transferred to the channels at $\lambda_2$ and $\lambda_3$, thus forming additional modulation tones ("ghost signals") on the channels at wavelength $\lambda_2$ and $\lambda_3$. These ghost signals will be in-phase with the original analogue maintenance signal.

Similarly, a proportion of the power from the channel at $\lambda_2$ (and hence a proportion of the analogue maintenance signal at frequency $f_2$) will be transferred to the channel at $\lambda_3$, resulting in an in-phase ghost signal of $f_2$ at wavelength $\lambda_3$. However, as the power transferred from the channel at $\lambda_1$ to the channel at $\lambda_2$ is proportional to not only the instantaneous power of the channel at $\lambda_1$, but also the instantaneous power of the channel at $\lambda_2$, then the power being transferred from the channel at $\lambda_1$ will be dependent upon the analogue maintenance signal $f_2$ within the channel at $\lambda_2$. In other words, the power transfer from wavelength $\lambda_1$ to wavelength $\lambda_2$ will result in a signal of frequency $f_2$ appearing within the channel at $\lambda_1$. This ghost signal at frequency $f_2$ at wavelength $\lambda_1$ will be the inverse (i.e. in anti-phase) to the instantaneous analogue maintenance signal $f_2$ at wavelength $\lambda_2$.

Similarly, the ghost signals of the analogue maintenance signal at frequency $f_3$ will all be in anti-phase to the original signal at wavelength $\lambda_3$, as power is being transferred from the channels at $\lambda_1$ and $\lambda_2$ to the channel at $\lambda_3$.

Within FIG. 3, the respective ghost signals, also termed ghost tones, are circled with a dotted line.

Figure 1:
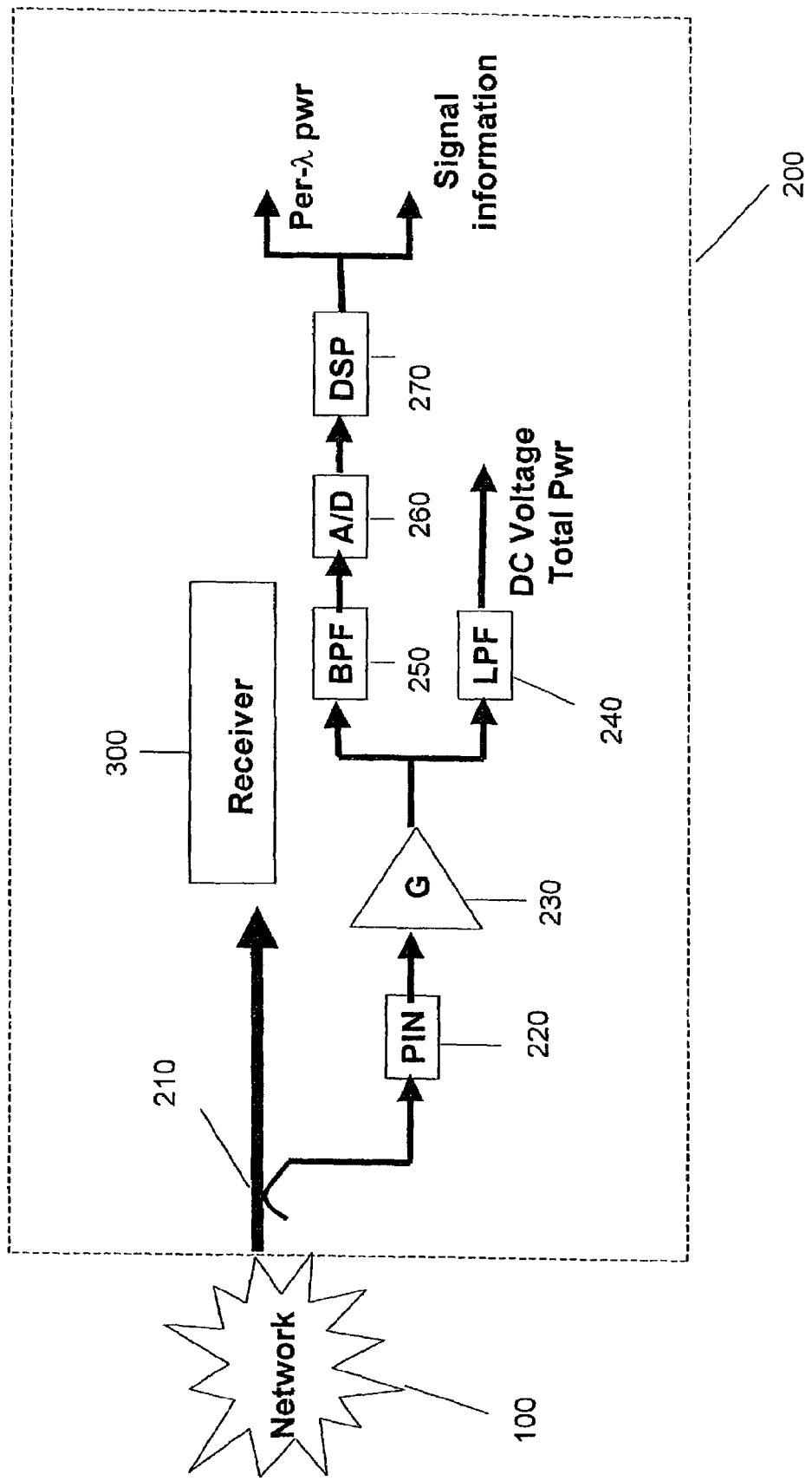
FIG. 1 is a schematic diagram of a typical analogue maintenance detector (PRIOR ART)
Figure 2:
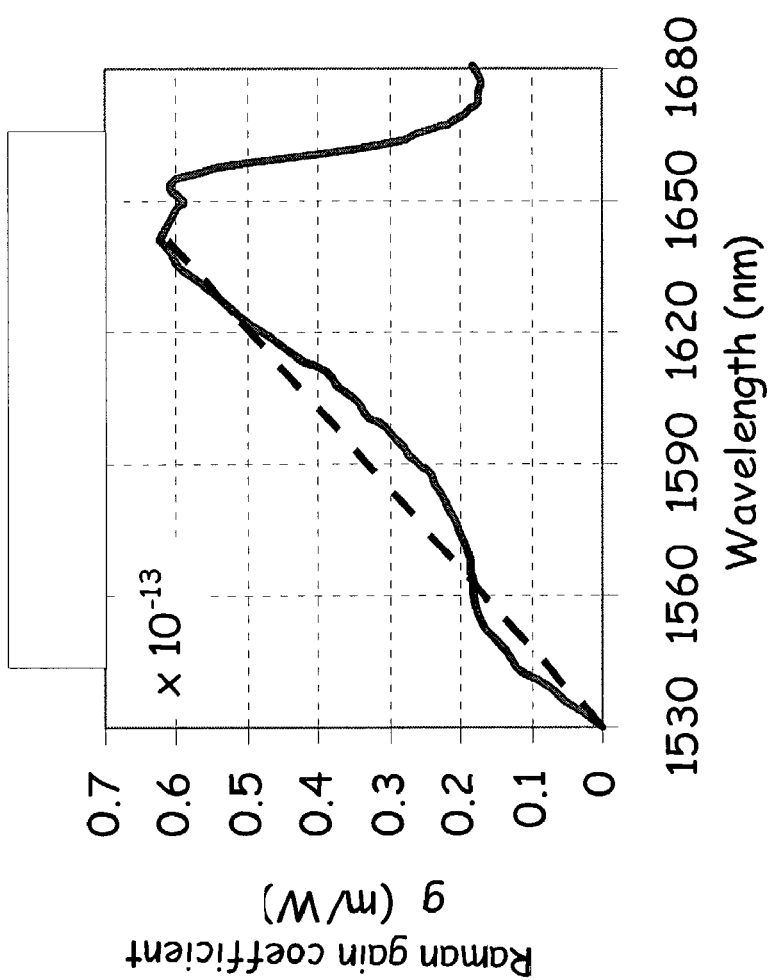
FIG. 2 shows a graph of the Raman gain coefficient as a function of wavelength, for a typical wavelength range used for optical communication (PRIOR ART)
Figure 4:
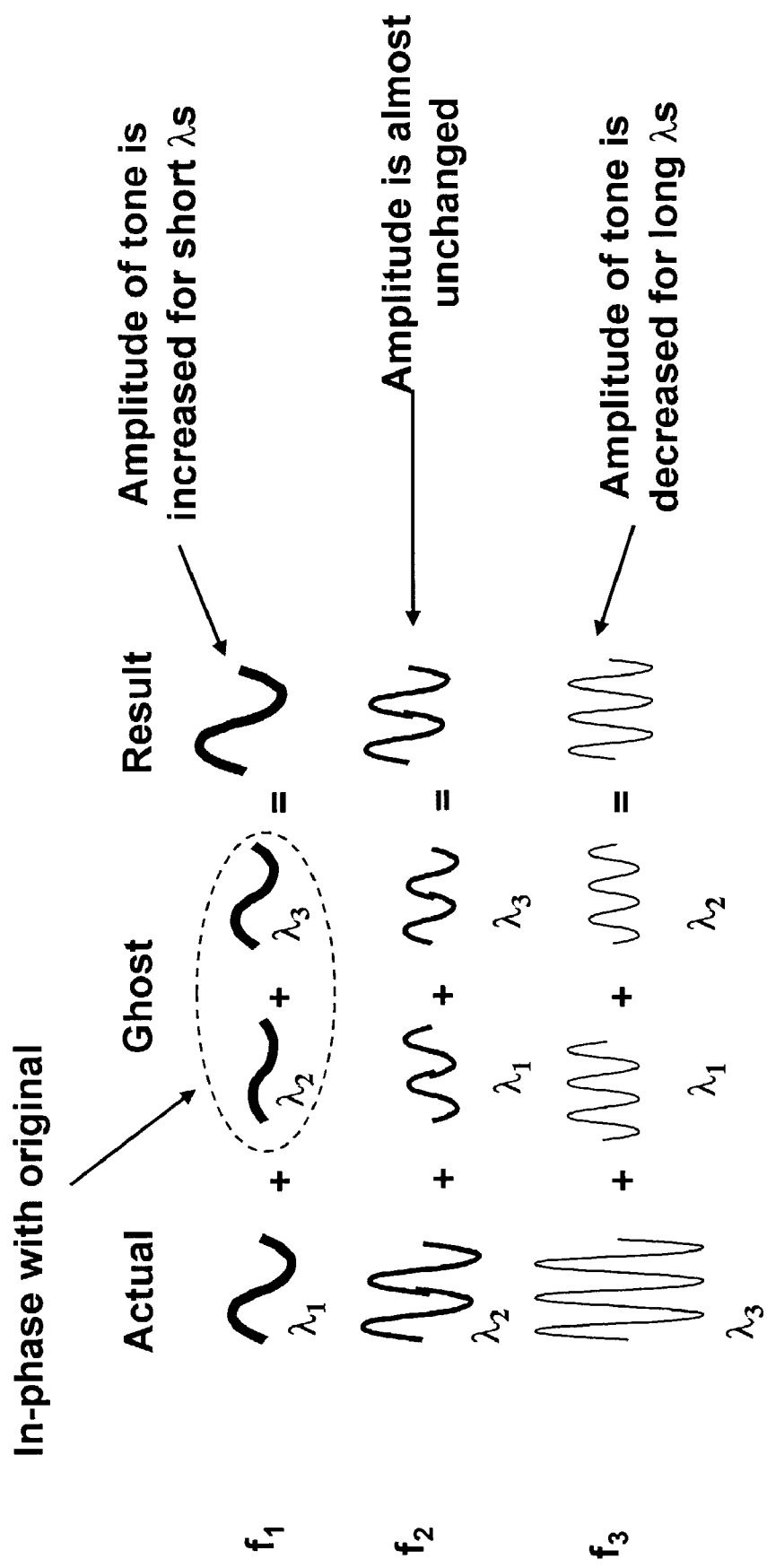
FIG. 4 illustrates how the actual analogue maintenance signal for each of the channels shown in FIG. 3 will be affected by ghost tones.

In the conventional analogue maintenance detector, as for instance shown in FIG. 1, a photo-detector 220 generates an electrical signal proportional to the total incident optical power i.e. the sum of the different powers within each channel. Consequently, as indicated in FIG. 4, each actual frequency component present on the respective channel will be summed with the ghost tones of the frequency component appearing on the other wavelengths.

For instance, the actual analogue maintenance signal at frequency $f_1$ on the channel at $\lambda_1$ (which has an amplitude proportional to the power of $\lambda_1$) will be summed with the in-phase ghost signals appearing on the channels at $\lambda_2$ and $\lambda_3$, thus resulting in a total frequency tone having a larger amplitude than the actual frequency tone $f_1$ on the channel at $\lambda_1$.

In contrast, the actual analogue maintenance signal $f_3$ on the channel at $\lambda_3$ will be summed with the two out of phase ghost versions of the analogue maintenance signal at frequency $f_3$ from channels at $\lambda_1$ and $\lambda_2$, thus resulting in a decreased amplitude $f_3$ component.

As the analogue maintenance signal at frequency $f_2$ on channel $\lambda_2$ will be summed both with an in-phase and an out of phase ghost tone from respectively the channel at $\lambda_3$ and the channel at $\lambda_1$, the amplitude of the signal will be almost unchanged.

The amplitudes of the frequency components are normally taken to be proportional to the power within the respective channel. It will thus be appreciated that, due to the ghost tones, the amplitude of the frequency components at relatively shorter wavelengths will be over estimated, and the amplitude of the frequency components at longer wavelengths under estimated, with a corresponding inaccuracy in the estimated power per channel. The present inventors have appreciated that this is likely to be a problem in optical communication systems utilising signals experiencing SRS, and propose apparatus and methods that allow improved accuracy in measuring such frequency components of analogue maintenance signals.

Figure 5:
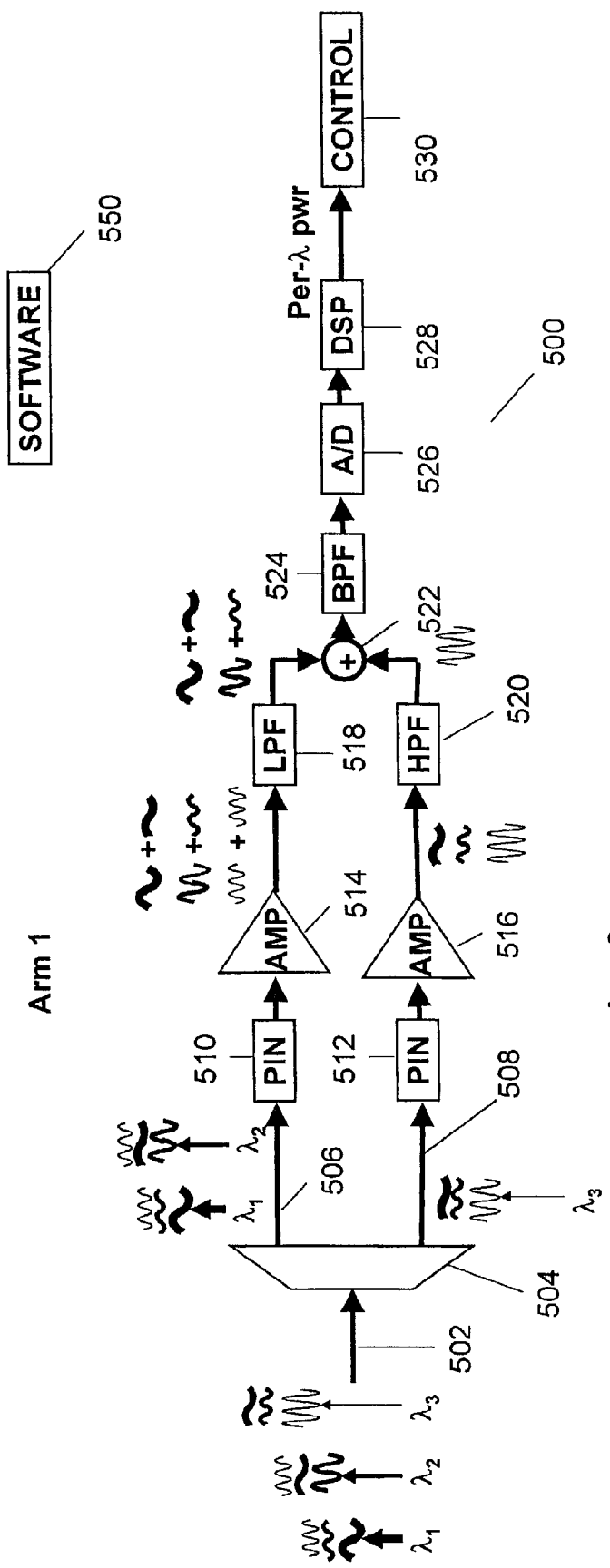
FIG. 5 shows a schematic diagram of an analogue maintenance detector in accordance with a preferred embodiment of the present invention.

FIG. 5 shows an apparatus 500 for detecting an analogue maintenance signal in accordance with a preferred embodiment of the present invention.

The apparatus comprises an input 502 for receiving an optical signal comprising a plurality of channels. In the example shown, the optical signal comprises three equally spaced channels at wavelengths $\lambda_1$, $\lambda_2$ and $\lambda_3$ (as described in relation to FIGS. 3 and 4).

The received optical signal is passed to a splitter 504. The splitter acts to split the received optical signal into two bands of wavelength. In this instance, the two bands are roughly of equal blocks of wavelength, with the lower wavelength band being provided via output 506 to Arm 1 (510, 514, 518), and the higher wavelength band being provided via output 508 to Arm 2 (512, 516, 520) of the detector.

In this particular example, the first band contains the short wavelength channel signals at $\lambda_1$ and $\lambda_2$, and the second higher band contains $\lambda_3$.

Each arm of the detector comprises a respective photo-detector 510, 512 arranged to produce an output signal proportional to the total power of the input optical signal. Further, each arm incorporates a filter 518, 520 arranged to pass substantially only the frequencies of the analogue maintenance signals within the optical band input to the relevant arm. For instance, the first arm has the two lower wavelength signals $\lambda_1$, $\lambda_2$, with respective analogue maintenance signals $f_1$, $f_2$. The low pass filter 518 is thus arranged to pass $f_1$ and $f_2$, but not pass $f_3$ i.e. the analogue maintenance signal of the channel at $\lambda_3$ (which is input to Arm 2).

Similarly, the high pass filter 520 is arranged to pass $f_3$, but not pass the lower frequency analogue maintenance signals $f_1$ and $f_2$.

For convenience, each arm further contains an electrical amplifier 514, 516, arranged to amplify the output signal of the respective photo detector 510, 512, prior to input to the filter.

If desired, the outputs of each filter could subsequently be separately analysed to determine the separate frequency components present, and the amplitudes of the frequency components. However, to reduce costs, the preferred embodiment shown in FIG. 5 re-combines the two output signals from the filters 518, 520 by an adder 522.

The output of the adder 522 is provided to a band pass filter, arranged to pass all analogue maintenance frequency signals, and to filter out extremely low and extremely high components that might be present in signal (e.g. due to the information bit-rate). This band pass filter 524 is the equivalent filter to the band pass filter 250 shown in FIG. 1.

As per FIG. 1, the output of the band pass filter 524 can subsequently be converted to a digital signal by the analogue to digital converter 526, and then processed by a digital signal processor 528 so as to determine the frequency components present (e.g. using Fast Fourier Transform processing). Subsequently, the frequency components present and the per channel power can be passed to a control unit 530.

The control unit 530 can use this information to control the performance of at least one of: a node incorporating the detector; a link through which at least a portion of the optical signal has been transmitted, or will be transmitted subsequent to the analogue maintenance signal measurement being made; or overall control of the connectivity within the network.

Computer software 550 may be used to implement control within the control unit 530, and/or may be used to control the detector 500, and/or perform part of the signal processing within the detector 500 (e.g. Fourier analysis of the electrical signal to determine the frequency components present, and the amplitudes of such frequency components).

It will be appreciated that the above apparatus does not function so as to remove all of the ghost tones of the analogue maintenance signals. However, it does serve to remove those ghost tones originating from channels a relatively long wavelength away from the relevant channel. Consequently, the accuracy of the detected amplitude of the relevant analogue maintenance tone is significantly improved.

It will also be appreciated that the above embodiment is provided by way of example only, and that various ways of implementing the apparatus will be apparent to the skilled person as falling within the scope of the present invention.

For instance, the splitter 504 has been described as splitting the received optical signal into two separate bands of wavelengths. Such a splitter could be a coarse Wavelength Division Multiplexer (WDM). If desired, the splitter could be arranged to split the received optical signal into three or more separate bands of wavelength.

In the preferred embodiment, the analogue maintenance signal on each channel has been referred to as a single frequency or tone. However, it will be appreciated that analogue maintenance signals might be provided by modulating each channel using a different modulation format, for instance one that would occupy a band of frequencies rather than a single frequency. It will also be appreciated that the present invention is applicable to such modulation formats.

Whilst the preferred embodiment has been described with respect to only three channels (at wavelengths ($\lambda_1$, $\lambda_2$ and $\lambda_3$) and respective analogue maintenance signals (at frequencies $f_1$, $f_2$ and $f_3$), it will be appreciated that the present invention could be implemented for any number of channels. Preferably, the splitter acts to split the optical signal into continuous bands of wavelength, for example a first band including all of the lower wavelength channels, and a second band including all of the higher wavelength channels. Preferably, the analogue maintenance frequencies are allocated to the channels such that, once the optical signal has been split into bands, the analogue maintenance signals for any band will fall within a respective, non-overlapping range of frequencies. This facilitates filtering of the frequency signals.

Figure 6:
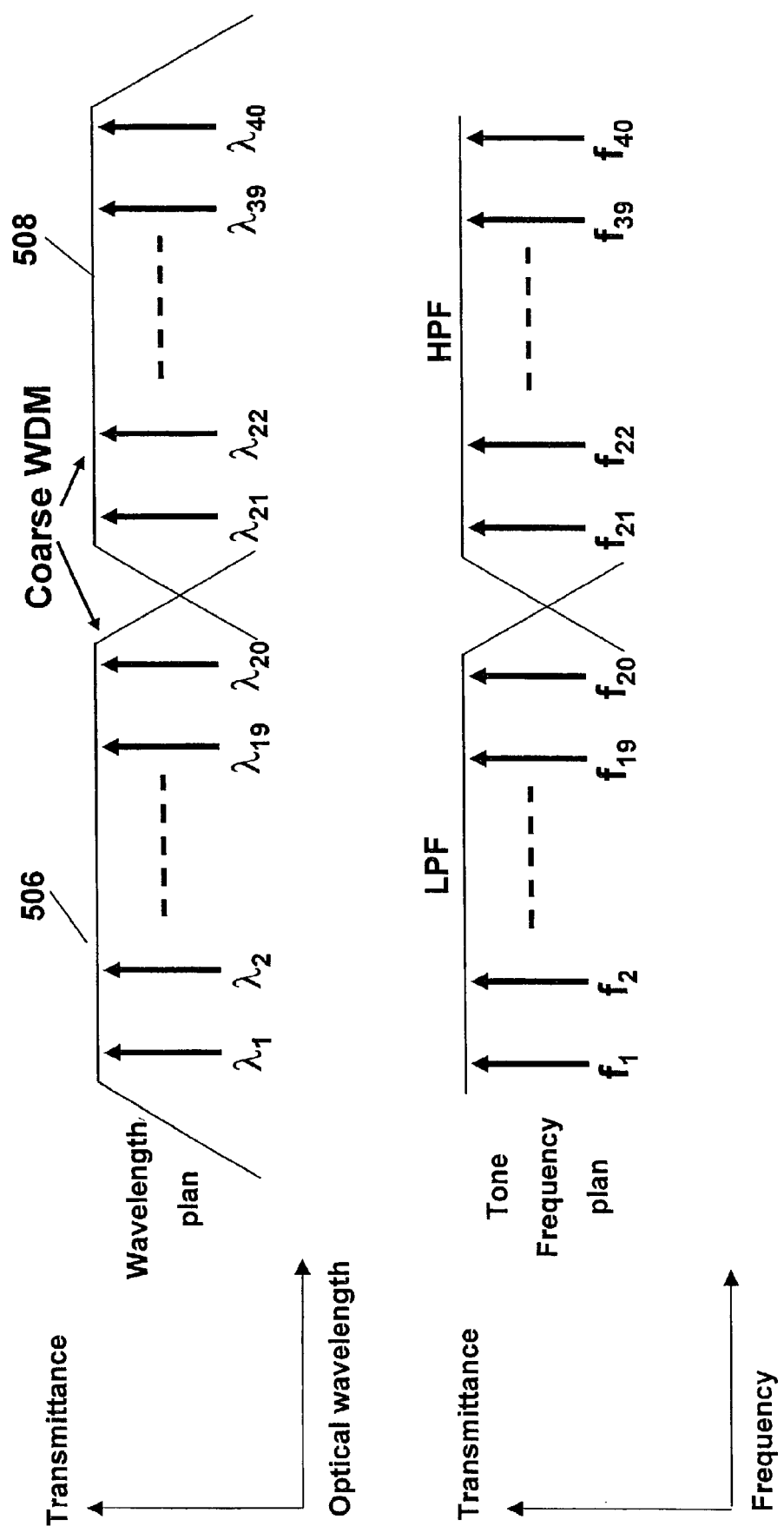
FIG. 6 illustrates the wavelength and frequency plan for the detector shown in FIG. 5 when utilised for determining the analogue maintenance signals of 40 channels, the splitter being implemented by a coarse Wavelength Division Multiplexer.

FIG. 6 shows an example where forty channels (at wavelengths $\lambda_1$, $\lambda_2$, $\lambda_3$, . . . $\lambda_{40}$) are utilised, each having a respective analogue maintenance frequency ($f_1$, $f_2$, $f_3$ . . . $f_{40}$). FIG. 6 illustrates the wavelength plan i.e. output 506 of the WDM filter can be arranged to pass the channels at wavelengths $\lambda_1$–$\lambda_{20}$, whilst output 508 of the filter can be used to pass the channels at wavelengths $\lambda_{21}$–$\lambda_{40}$. Equally, the low pass filter 518 is arranged to pass analogue maintenance frequencies $f_1$–$f_{20}$, and the high pass filter 520 to pass frequencies $f_{21}$–$f_{40}$.

Alternative low and high pass frequency plans, and splitter characteristics can be used other than those shown in FIG. 6. For instance, the splitter need not split the received optical signal into two completely separate optical bands. The splitter merely needs to operate so as to ensure that each portion of the respective signal from the splitter contains the majority of the desired optical band, and a minority (i.e. less than 50%) of the undesired optical band(s) signal.

An alternative embodiment of the present invention utilises a fused fibre coupler as the splitter 504. This offers slightly reduced accuracy compared to a detector incorporating a wavelength division multiplexer, but at a reduced cost.

Fused fibre couplers typically have a sinusoidal transmittance behaviour with respect to wavelength. In the preferred embodiment, each output 506, 508 of the fused fibre coupler is arranged to have full excursion across the total range of wavelengths within the optical signal. For instance, a typical band of wavelength utilised to transmit optical signals is the C-band of Erbium, with channels being arranged between wavelengths 1530 and 1560 nm.

Figure 7:
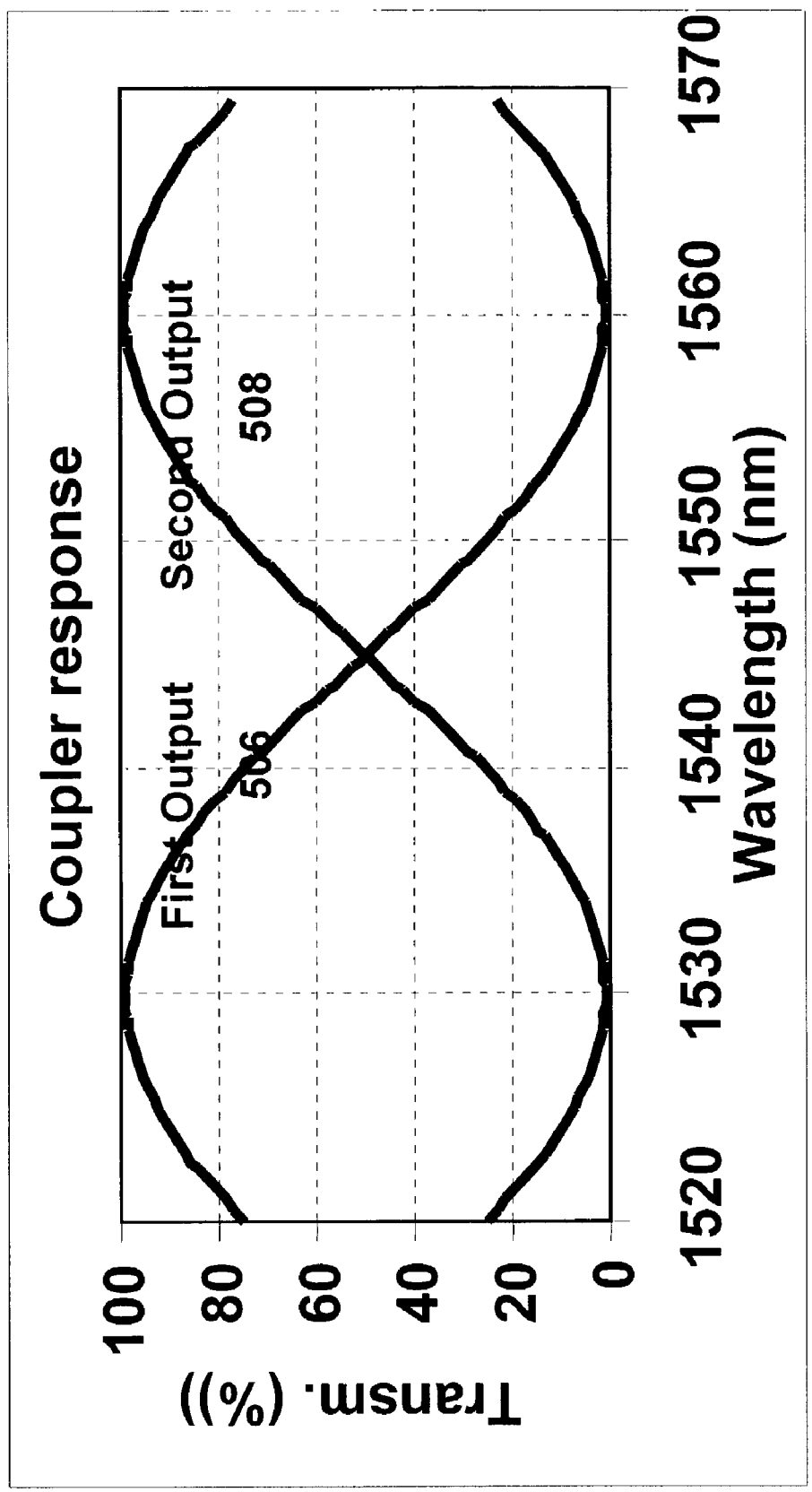
FIG. 7 illustrates the performance of the transmittance of a fused fibre coupler as a function of wavelength, the coupler being suitable for use in the detector shown in FIG. 5.

FIG. 7 illustrates the transmittance response of a fuse fibre coupler acting as a splitter 504 for an optical signal containing only channels within the C-band. As can be seen, the first output 506 of the splitter is arranged to have a peak transmittance at the low wavelength end of the signal (1530 nm), and a minimum transmittance at the high wavelength end of the band (1560 nm), with the other output 508 having a converse transmittance response.

Figure 8:
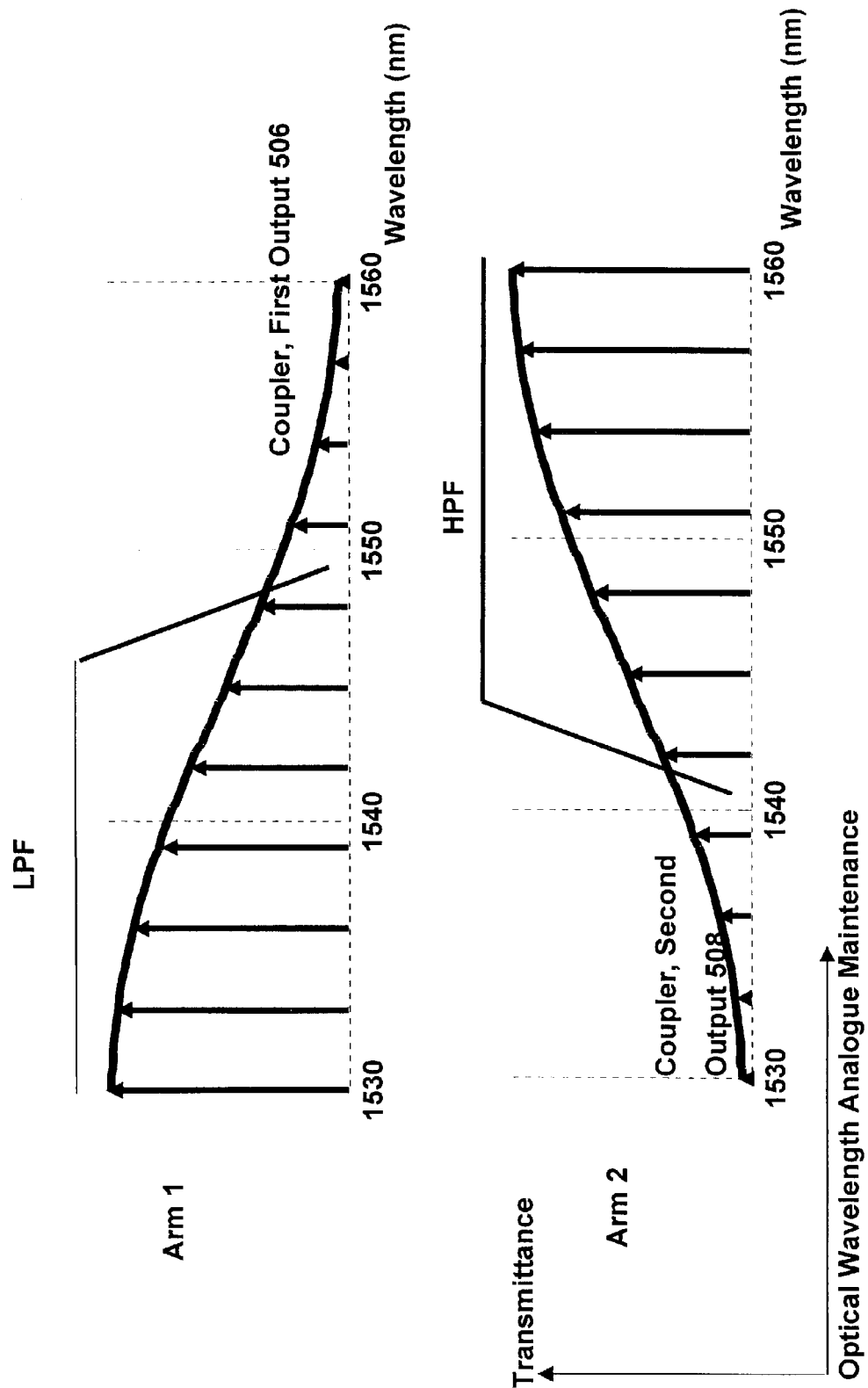
FIG. 8 shows the fused fibre coupler transmittance and the filter transmittances for a grid of channels according to a preferred implementation of the apparatus shown in FIG. 5.

FIG. 8 illustrates the wavelength and frequency plan for a detector incorporating such a fused fibre coupler splitter. For convenience, it is assumed that each of the optical wavelengths has a respective analogue maintenance frequency signal at a similarly increasing frequency. Consequently the low pass filter within Arm 1 connected to output 506 of the coupler is arranged to pass the lower frequency analogue maintenance signals, whilst the high pass filter on the other arm is arranged to pass the higher frequency analogue maintenance signals corresponding to the longer wavelength optical channels.

It will be noted that in this instance, there is some overlap between the pass bands of the low pass filter and the high pass filter. This overlap is provided so as to compensate for the fact that the coupler has a slowly changing transmittance response. However, as this overlap occurs for analogue maintenance frequencies corresponding to channels having optical wavelengths close to the centre of the range of wavelengths used for transmission, then these frequencies are relatively unaffected by SRS when the wavelength band is fully utilised.

Figure 9:
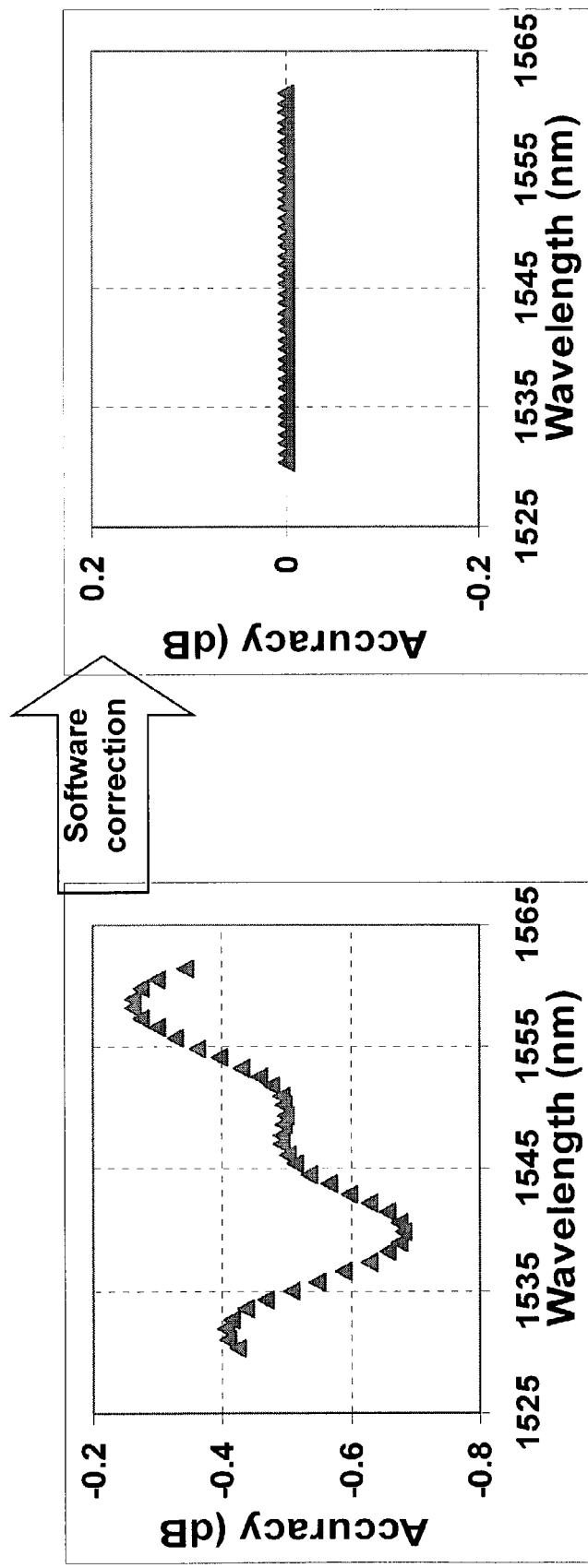
FIG. 9 shows how the accuracy of the detector varies as a function of wavelength due to the fused fibre coupler and filter characteristics (first graph), but how this fixed offset can be corrected so as to improve accuracy (graph 2)

Due to the coupler and filter characteristics shown in FIG. 8, the analogue maintenance tones received at the input to the digital signal processor will have different amplitudes even if all of the channels are of equal power and no SRS has taken place. The left hand chart in FIG. 9 shows the resulting reduction in accuracy due to such coupler and filter characteristics. However, this error is a fixed receiver offset, and can therefore be corrected e.g. by using software, to give the accurate response illustrated in the right hand chart of FIG. 9.

Figure 10:
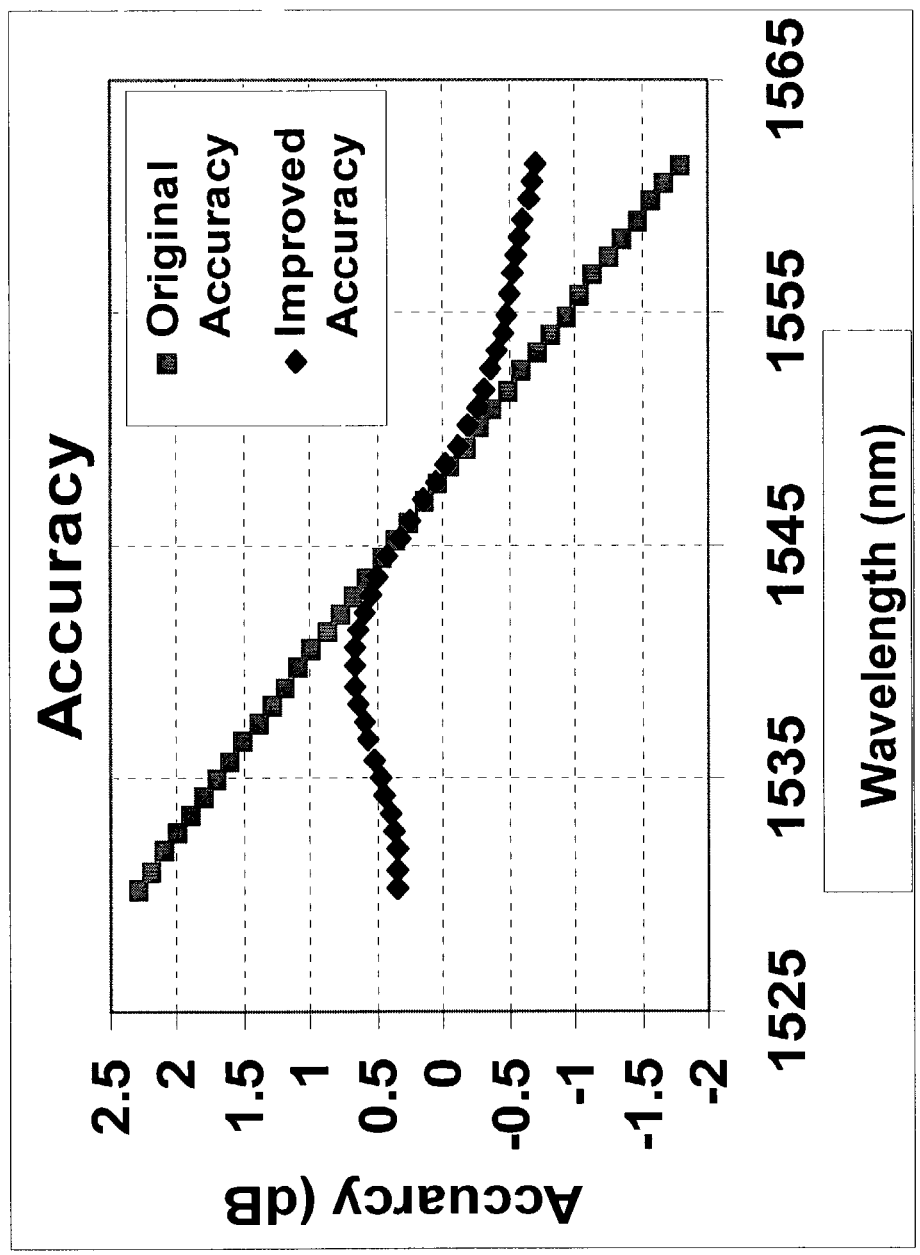
FIG. 10 illustrates the accuracy of the present invention compared with a conventional analogue maintenance detector, as a function of wavelength.

FIG. 10 shows a comparison between the predicted accuracy of a conventional analogue maintenance detector ("original accuracy"), corresponding to performance of a detector has shown in FIG. 1, and a detector as shown in FIG. 5 ("improved accuracy") at different wavelengths. This chart assumes that the low pass and high pass filters were fourth order Chebyshev filters, and takes into account the SRS ghost tone generation, the coupler response, the filtering attenuation and the phase. As can be seen, the original accuracy varies from approximately 2.3 to −1.8 dB across the C-band. However, the present invention increases the accuracy of the measurement of the power per wavelength such that the accuracy always remains within the range 0.6 to −0.6 dB.

Figure 11:
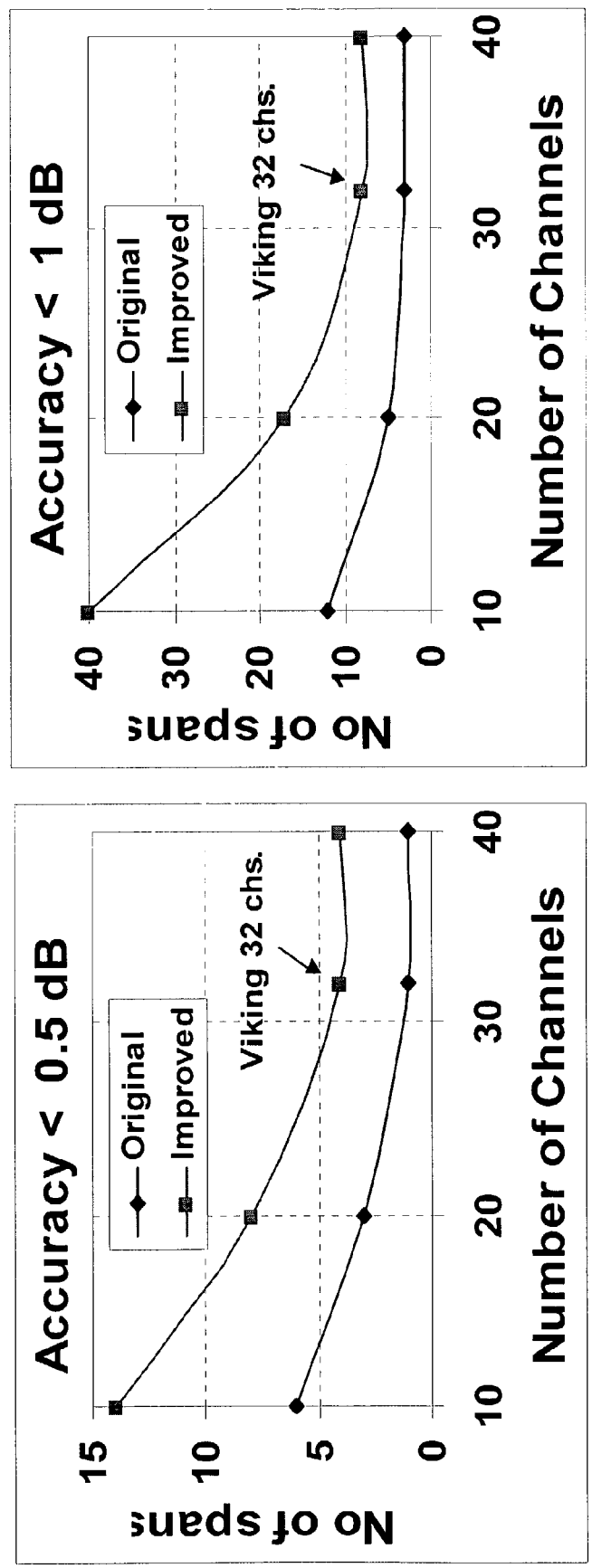
FIG. 11 shows two graphs, comparing the performance between a conventional analogue maintenance detector and a detector according to the preferred embodiment, each graph indicating the maximum number of channels permitted so as to maintain the accuracy of the analogue maintenance detection within a predetermined limited.

FIG. 11 provides performance predictions comparing the original and improved analogue maintenance detection techniques for different system configurations. In all cases, the spacing between channels was chosen such that the channels covered the entire C-band. The graphs indicate for each number of channels, the maximum number of spans of optical fibre that maintain the analogue maintenance detection accuracy within a predetermined limit (0.5 dB and 1 dB). It will also been seen that by utilising an analogue maintenance technique in accordance with the present invention, a greater number of lengths of optical fibre can utilised compared with the conventional technique whilst still maintaining a given level of accuracy.

It will be apparent to the skilled person that various alternative analogue maintenance schemes, which split the received optical signal into two or more bands prior to analogue maintenance detection, will be understood as falling within the scope of the present invention. FIGS. 12–15 utilise identical reference numerals for those components that are equivalent to the corresponding components in the apparatus shown in FIG. 5.

Figure 12:
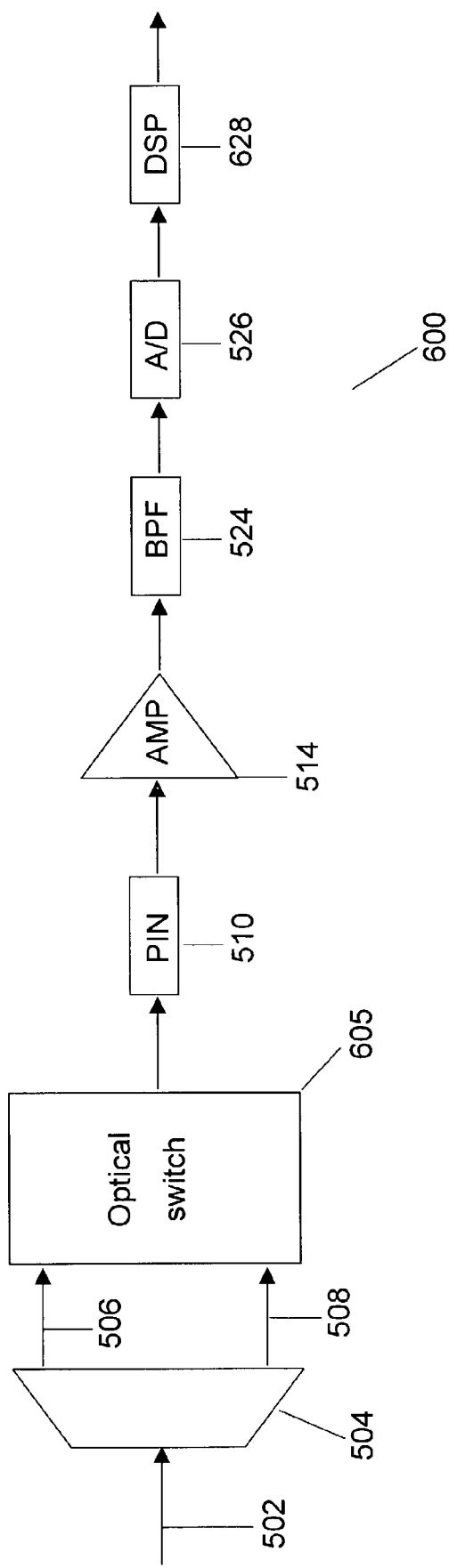
FIG. 12 shows a schematic diagram of an analogue maintenance detector in accordance with a further embodiment to the present invention.

The analogue maintenance detection apparatus 600 shown in FIG. 12 is arranged to receive a tap of an optical signal at input 502. Splitter 504 splits the optical signal into two bands of equal blocks of wavelength, with one wavelength band being provided by output 506 to a first input of an optical switch 605, and the other wavelength band being provided via output 508 to a second input of the optical switch.

The optical switch 605 has two inputs and a single output. The switch 605 is arranged to switch one of the inputs to the output, the output being subsequently detected by photo detector 510. The photo detector 510 is arranged to produce an output signal proportional to the total power of the total power of the input optical signal. Hence, by toggling the optical switch so as to direct in turn the two bands of wavelength to the photo detector, the photo detector can separately detect both the first band and the second band.

Subsequently, the resulting optical signal relating to the detected optical band is amplified by electrical amplifier 514, filtered by band pass filter 524 and converted to a digital signal by analogue to digital converter 526. In this particular instance, the low pass filtering and the high pass filtering are performed digitally by the digital signal processor 628.

Figure 13:
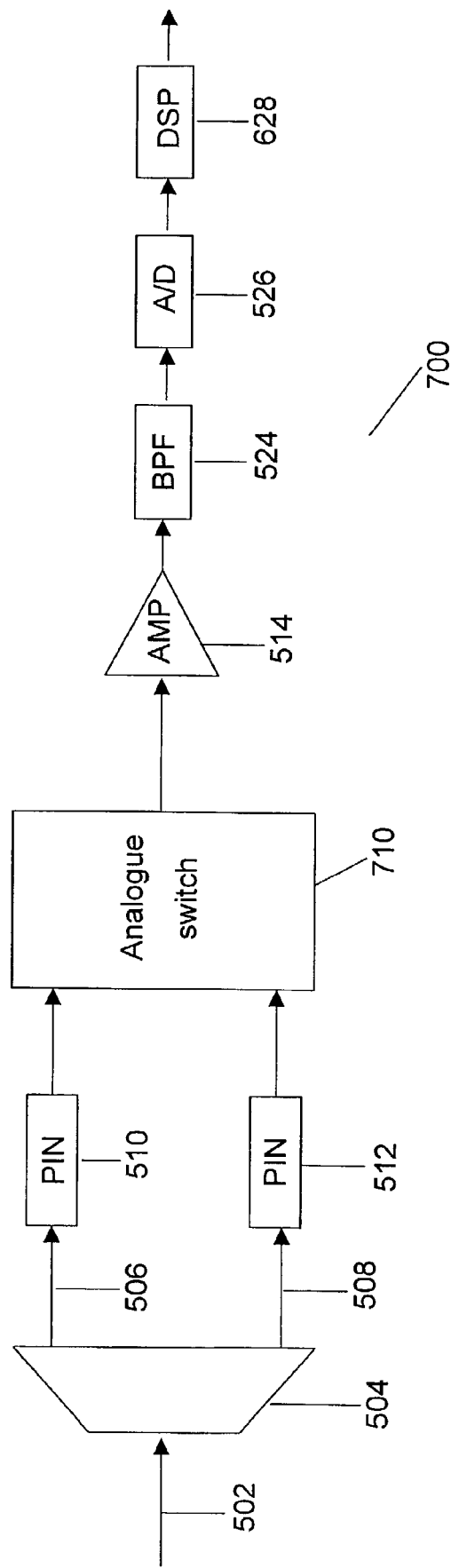
FIG. 13 shows a schematic diagram of an analogue maintenance detector in accordance with another embodiment to the present invention.

In the detection apparatus 700 illustrated in FIG. 13, the two bands of optical signal are separately detected by respective photo detectors 510, 512.

An electrical switch 710 is arranged to switch either the electrical signal from photo diode 510 or the electrical signal from photo diode 512 to the amplifier 514. Hence, by using the switch to take alternate samples from the two photo diodes, and individually processing each of the signals, an improved analogue maintenance detection can be performed. Again, in this instance, the low pass filtering and the high pass filtering (performed by the filters 518, 520 in FIG. 5) are performed by the digital signal processor 628.

Figure 14:
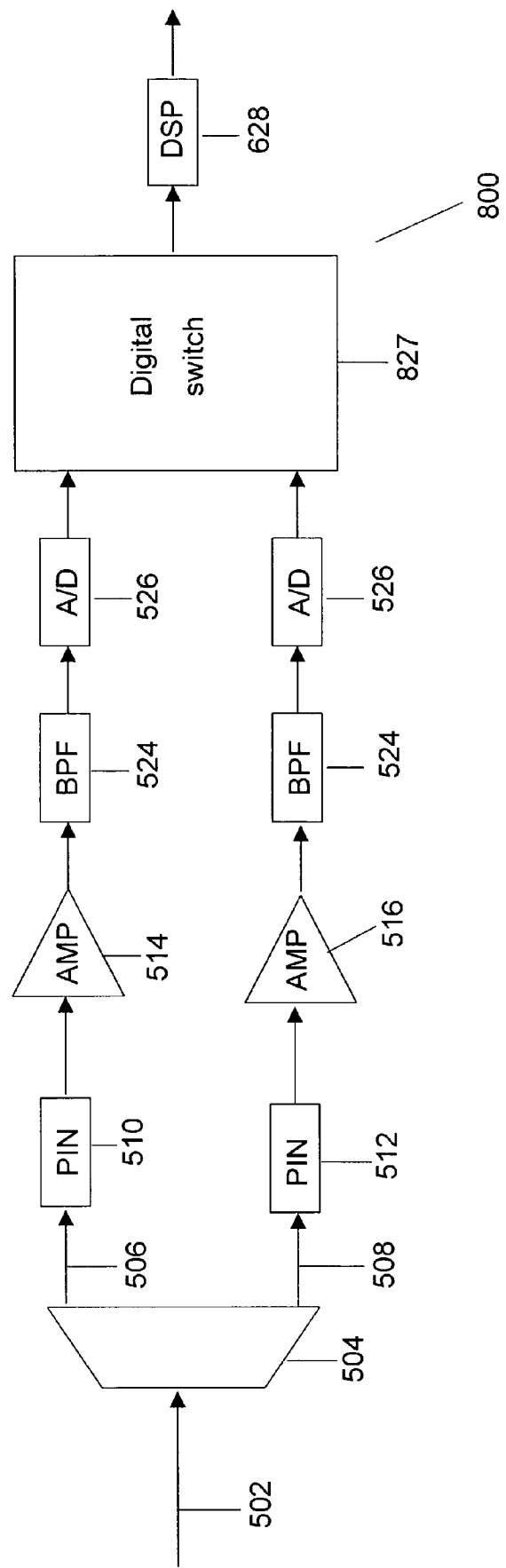
FIG. 14 shows a schematic diagram of an analogue maintenance detector in accordance with a further embodiment to the present invention.
Figure 15:
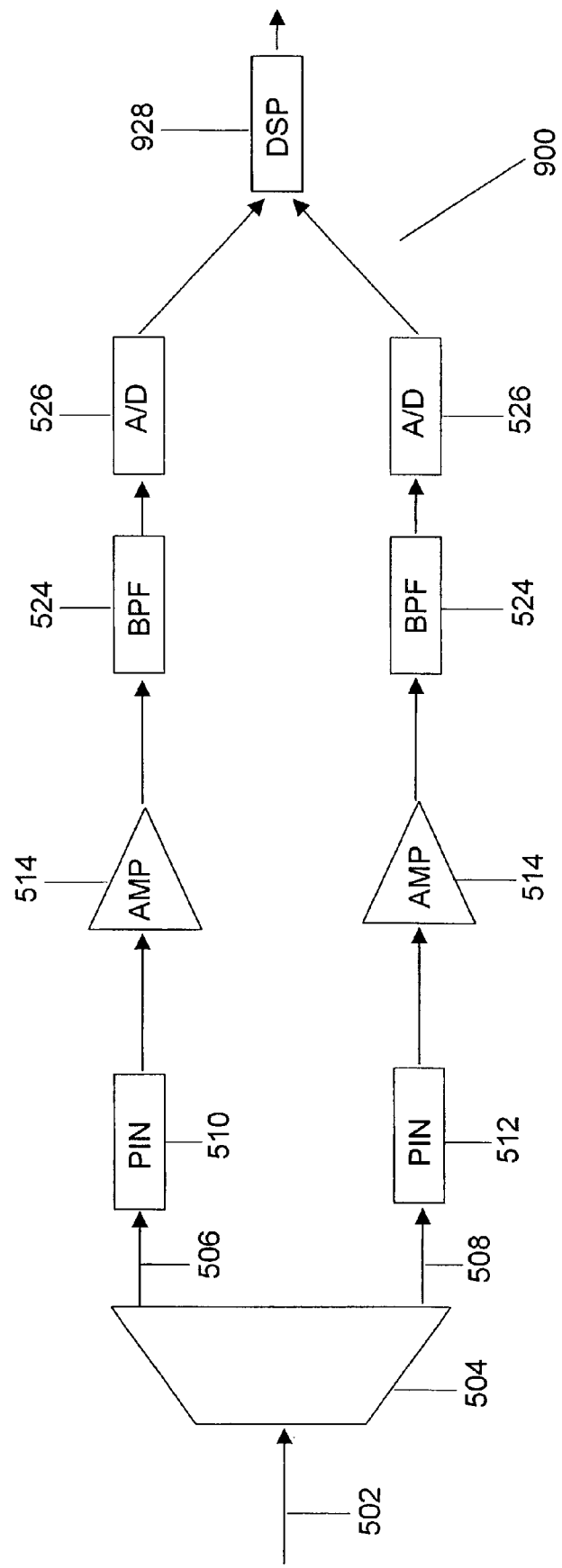
FIG. 15 shows a schematic diagram of an analogue maintenance detector in accordance with another embodiment to the present invention.

FIGS. 14 and 15 show similar apparatus, in which each of the optical bands from the splitter outputs 506, 508 are separately photo detected, electrically amplified, band pass filtered and analogue to digitally converted.

In the detection apparatus 800 illustrated in FIG. 14, a digital switch 827 acts to direct either the digital signal corresponding to the first band to the digital signal processor 628, or the digital signal corresponding to the second band to the digital signal processor 628. Again, by toggling the switch, alternative samples can be taken of each signal.

In the apparatus 900 illustrated in FIG. 15, the digital signal processor 928 has two inputs. The digital signal processor can be arranged to either process each of the inputs in parallel, or alternatively switch between the inputs (so as to effectively combine the operation of digital switch 827 and DSP 628 shown in FIG. 14).

Again, in both the digital signal processor 628 shown in FIG. 14 and the digital signal processor 928 shown in FIG. 15, the DSP acts to perform the low pass filtering and the high pass filtering.

Another aspect provides a method of offering a data transmission service over a network utilising optical signal processing in accordance with the present invention. As the advantages of the invention can enable a better network, which is more reliable, or more flexible, or having greater capacity, or more cost effective for example, consequently a data transmission service over a network can show a corresponding improvement, and the value of such services can increase. Such increased value over the life of the system, could prove far greater than the sales value of the equipment.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus for processing an optical signal, the optical signal comprising at least a first channel signal at a first wavelength modulated by a first frequency, a second channel signal at a second wavelength modulated by a second frequency, and a third channel signal at a third wavelength modulated by a third frequency, the apparatus comprising:
   an input for receiving the optical signal;
   a splitter arranged to split the received optical signal into at least two optical bands, a first optical band comprising at least the first channel signal, without the third wavelength and a second optical band comprising at least the third channel signal, without the first wavelength;
   a first photo detector arranged to receive the first optical band, and to output a first electrical signal proportional to the total optical power of the first optical band;
   a second photo detector arranged to receive the second optical band, and to output a second electrical signal proportional to the total optical power of the second optical band;
   circuitry to compensate the first and second electrical signals for at least some of SRS induced amplitude modulations on at least the first and third wavelengths, induced by power transfer of amplitude modulations from other wavelengths, and circuitry to determine the modulation amplitudes at the first and third frequencies, from the compensated first and second electrical signals, and to determine the optical power levels at different wavelengths from the modulation amplitudes.

2. An apparatus as claimed in claim 1, further comprising;
   a first electrical filter arranged to filter the first electrical signal so as to pass said first frequency and to block said third frequency; and
   a second electrical filter arranged to filter the second electrical signal so as to pass said third frequency and to block said first frequency.

3. An apparatus as claimed in claim 2, the apparatus further comprising an adder arranged to sum the filtered electrical signals.

4. An apparatus as claimed in claim 1, the apparatus further comprising a signal processing unit arranged to analyse the electrical signal to determine the amplitudes of frequency components within the signal.

5. An apparatus as claimed in claim 1, wherein said splitter comprises a fused fibre coupler.

6. A node for an optical network comprising an apparatus as claimed in claim 1.

7. An optical network comprising a node as claimed in claim 6.

8. A method of offering a data transmission service over an optical network comprising a node as claimed in claim 6.

9. A method of processing an optical signal, the optical signal comprising at least a first channel signal at a first wavelength modulated by a first frequency, and a second channel signal at a second wavelength modulated by a second frequency, and a third channel signal at a third wavelength modulated by a third frequency, the method comprising the steps of:
   receiving the optical signal;
   splitting the received optical signal into at least two optical bands, a first optical band comprising at least the first channel signal, without the third wavelength, and a second optical band comprising the third channel signal without the first wavelength;
   producing a first electrical signal proportional to the total optical power of the first optical band,
   producing a second electrical signal proportional to the total optical power of the second optical band,
   compensating the first and second electrical signals for at least some of SRS induced amplitude modulations on at least the first and third wavelengths, induced by power transfer of amplitude modulations from other wavelengths,
   determining the modulation amplitudes at the first and third frequencies, from the compensated first and second electrical signals, and
   determining the optical power levels at different wavelengths from the modulation amplitudes.

10. A method as claimed in claim 9, wherein at least said first frequency is an analogue maintenance signal.

11. A method as claimed in claim 9, wherein the first optical band comprises over 50% of said first channel signal and less than 50% of said third channel signal.

* * * * *